United States Patent [19]

Morell et al.

[11] 4,350,651

[45] Sep. 21, 1982

[54] PROCESS FOR THE RAPID SINTERING OF CERAMIC COMPONENTS AND A KILN FOR CARRYING OUT SAID PROCESS

[75] Inventors: Antoinette Morell; Antonio Hermosin, both of Paris, France

[73] Assignee: Thomson-CSF, Paris, France

[21] Appl. No.: 181,668

[22] Filed: Aug. 26, 1980

Related U.S. Application Data

[63] Continuation of Ser. No. 968,818, Dec. 12, 1978, abandoned.

[30] Foreign Application Priority Data

Dec. 13, 1977 [FR] France .................................. 77 37469

[51] Int. Cl.³ ........................ C04B 35/28; C04B 35/36
[52] U.S. Cl. .................................. 264/65; 252/62.56; 264/66
[58] Field of Search .......................... 541/968, 818; 252/62.53, 62.56; 264/66, 65

[56] References Cited

U.S. PATENT DOCUMENTS 3,036,009  5/1962  Zerbes ............................ 252/62.62

FOREIGN PATENT DOCUMENTS 1173697  12/1969  United Kingdom .

Primary Examiner—John A. Parrish
Attorney, Agent, or Firm—Oblon, Fisher, Spivak, McClelland & Maier

[57] ABSTRACT

A process for rapidly sintering ceramic components, in particular of the type utilized in electronics (ferrites), which reduces the sintering time by a factor of from ten to one hundred, reducing the volume of the kiln and resulting in a considerable saving in electric power. In this process the unbaked components previously shaped by pressing with a binder are sintered without carrying out the prior heat treatment of elimination of the binder. The sintering is made according an accurate curve of temperature as concerns the slopes of the rising and descending parts of the curve. The maximum of the curve exceeds by from 100° C. to 300° C. the normal temperature of sintering in the conventional method. The kiln, which is of the passage type with a conveyer belt sliding on rods of alumina, has six heating zones regulated by a thermocouple and a feedback loop pertaining to each zone so as to achieve a heating profile with a high accuracy.

2 Claims, 3 Drawing Figures

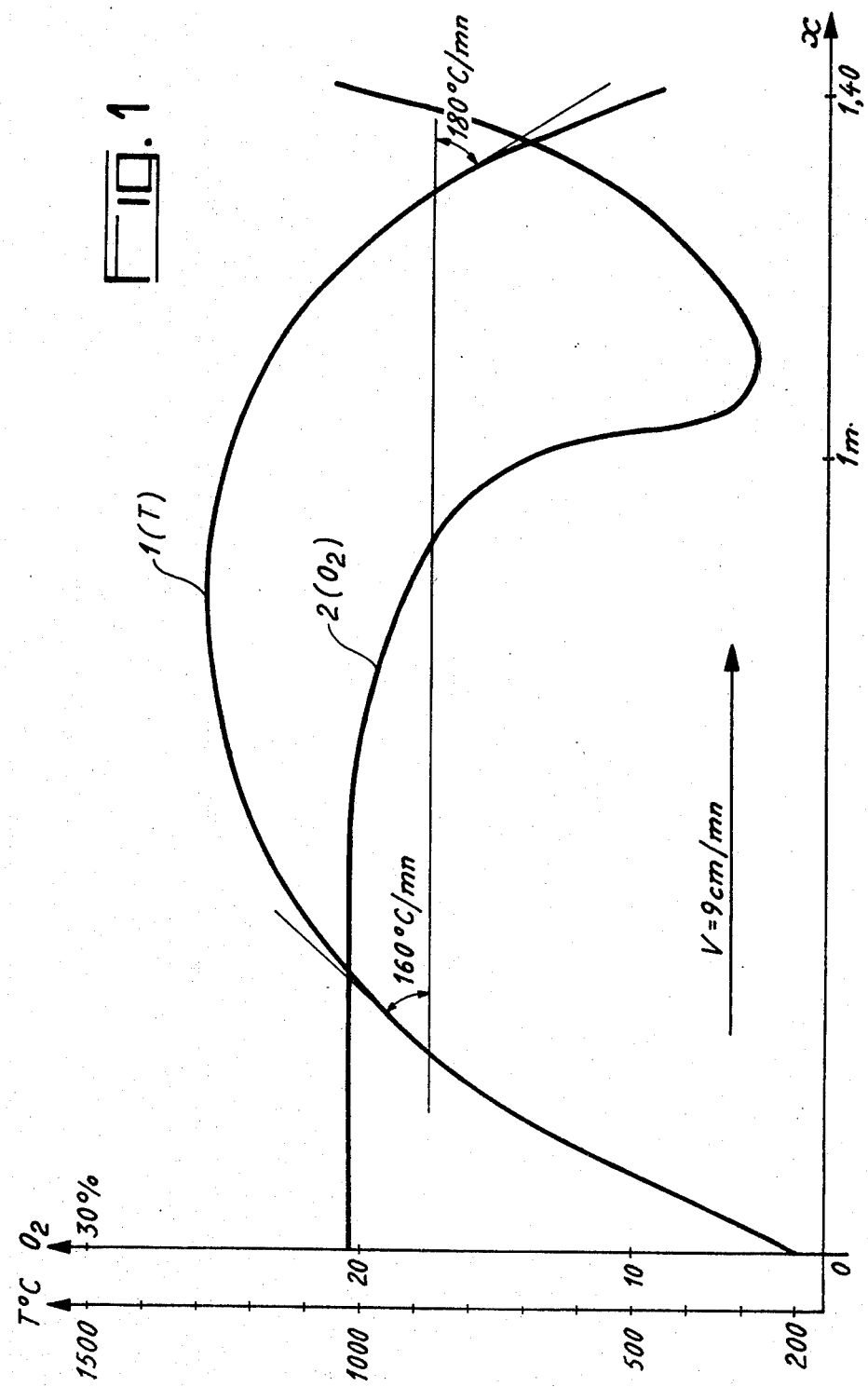

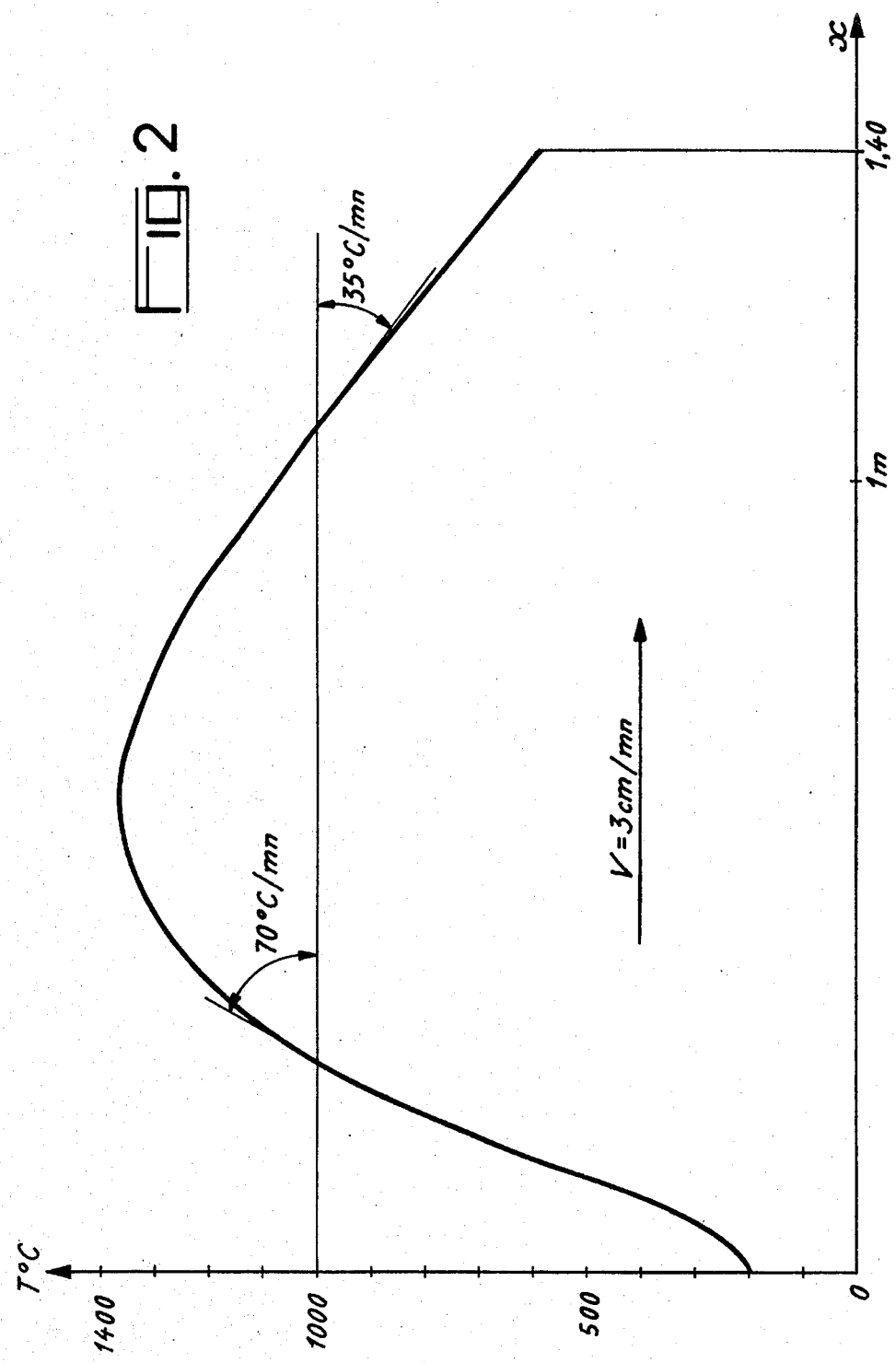

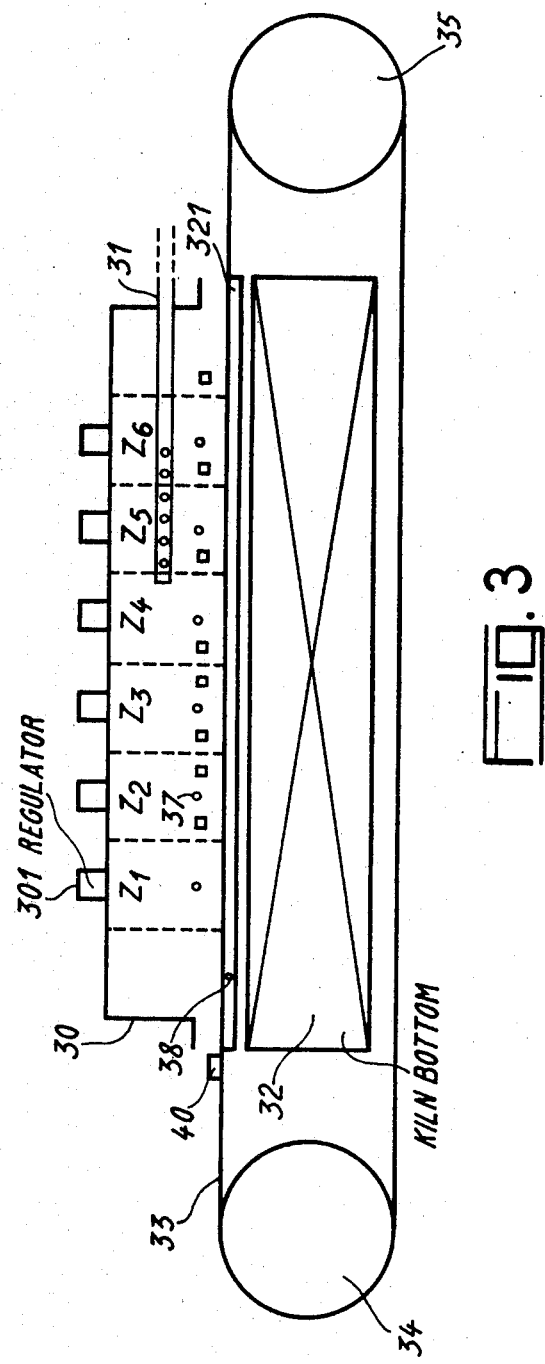

PROCESS FOR THE RAPID SINTERING OF CERAMIC COMPONENTS AND A KILN FOR CARRYING OUT SAID PROCESS

This is a continuation of application Ser. No. 968,818, filed Dec. 12, 1978 now abandoned.

The invention relates to a rapid process for sintering ceramic components, in particular of the type utilized in electronics for example the telecommunications pot-cores in ferrite.

It is known that one of the main factor of the cost of sintered ceramic components is the cost of the sintering. Indeed the sintering process is usually in the case of sophisticated components a long heat treatment requiring heavy equipment (tunnel furnaces having a high heat inertia, several meters in length, etc.). This equipment operates continuously under the supervision of personnel in several shifts per 24 hours. The investment in furnaces is high. The amount of energy consumed for the heating is considerably increased by the great weight of the refractory parts constituting the furnace and the tools travelling through the tunnel furnace, in particular the supports containing the components to be sintered. Generally the amount of energy actually employed in the heating of the components themselves is reckoned to be less than ten percent.

The invention enables the various factors contributing to the cost of sintering to be considerably reduced. It also has the following main advantages:

(i) the duration of the sintering heat treatment is from one hundredth to one tenth of the duration of the conventional heat treatment;

(ii) the dimensions and consequently the weight and the thermal inertia of the sintering furnace, are divided by a factor which is equal to or greater than ten for a given output of components; the saving in energy is considerable;

(iii) the evacuation of the binder introduced at the moment of compacting the unbaked component is no longer essential, which permits an elimination of a prior heat treatment of these components;

(iv) the handling of the components can be dispensed with at certain stages by placing a rapid sintering kiln downstream of the compacting press, the components being conveyed from the press to the furnace or kiln by a conveyer belt or some other conventional means for conveying and positioning the objects.

According to the invention there is provided a process for rapidly sintering ceramic components, wherein each component in the state of unbaked component is subjected to a heat treatment, said treatment having a total duration of less than sixty minutes, during which treatment the curve of the temperature as a function of the time has a first part rising with a positive slope between 50° C./min and 500° C./min, then a second part which rises then descends in passing through a maximum exceeding by 100° C. to 300° C. the normal temperature of conventional sintering, and a third part descending with a negative slope of absolute value between 30° C./min and 300° C./min.

A better understanding of the invention will had, and further features will appear, from the ensuing description relating to the rapid sintering of manganese-zinc and nickel-zinc ferrites, with reference to the accompanying drawings, in which:

FIG. 1 is an example of a graph relating to the conditions of the sintering of manganese-zinc ferrites;

FIG. 2 is an example of a graph relating to the conditions of the sintering of nickel-zinc ferrites;

FIG. 3 is a diagrammatic view of a sintering kiln according to the invention.

There will first be described, by way of example, the rapid sintering of manganese-zinc ferrite according to the invention.

There is utilized the conventional method for preparing manganese-zinc ferrites intended to form telecommunication pot-cores.

A material is chosen whose main components have, in the initial mixture, the following proportions:

$Fe_2O_3$: 0.544 (in moles);
$MnO$: 0.3035 (in moles);
$ZnO$: 0.1525 (in moles).

Further, this composition comprises additions of small amounts of calcium and titanium oxides in conventional proportions for producing the desired properties of the telecommunications pot-cores.

The preparation of the unbaked components comprises the conventional steps of grinding and firing, possibly repeated, screening of the powder thus obtained and the shaping by unbaked components, pressing the powder with the previous inclusion of a binder.

In a conventional method, the binder must be removed by heating to 600° C. In the case of the invention, the latter operation may be dispensed.

In the chosen example, the sintering is carried out under the following conditions, on half-cores for telecommunications pot-cores having the following dimensions:

diameter: 14 mm;
height: 4 mm.

The heat treatment is represented by the curves 1 (T) and 2 ($O_2$) of FIG. 1. Plotted as abscissae along Ox is the path travelled through in meters in a kiln having a passage or tunnel of 1.40 meters at a speed V of around 9 cm/min. As ordinates, there is a first scale relating to the curve 1 (T) in which there is plotted the temperature T in degrees Celsius from about 200° C. to 1500° C. A second scale relating to the curve 2 ($O_2$) gives the percentage of oxygen in the atmosphere locally surrounding the component in the course of sintering.

The maximum of the curve 1 (T) is reached at T=1300° C., substantially in the middle of the passage kiln. The slopes at the points of intersection of the curve and the line of the ordinate 870° C. are around +160° C./min in the rising part and −180° C./min in the descending part.

The minimum of the curve 2 ($O_2$) is about 5% of oxygen at 1.1 meters from the entrance of the kiln.

The kiln represented diagrammatically in FIG. 3 comprises a tunnel with a vault 30 having six heating zones $Z_1$ to $Z_6$ including rhodium-plated platinum windings supplied with electric current under the control of regulators 301.

A tube of alumina 31 provided with a plurality of apertures and slidable in the kiln in a direction parallel to the vault, permits the supply of nitrogen at points which are so disposed as to produce the desired atmosphere curve. In the example of FIG. 1, the supply of nitrogen is 3.5 liters per minute at a distance of about 0.40 meter from the exit of the kiln; the introduction of gas is in opposite direction to the direction of travel of the components 40 in the passage kiln.

The bottom 32 of the kiln has rods 321 of alumina disposed longitudinally and adapted to act as a runway for the conveyor belt 33 of the passage kiln. This belt has a width of 75 mm and is of a fabric woven from rhodium-plated platinum; it is held taut between two pulleys 34 and 35 which rotate in synchronism.

Regulating thermocouples 37 measure the temperature in each zone and are included in feedback loops (not shown) which exist between thermocouples 37 and regulators 301, with the setting of desired values so as to produce the desired thermal profile. Measuring thermocouples 38 are disposed inside the rods 321 supporting the belt.

In the example shown in FIG. 1 the total passage time is about 16 minutes. But a satisfactory sintering can also be obtained with a different speed of travel in particular within the following limits:
total passage time: 16 to 33 minutes;
maximum temperature: around 1300° C.;
supply of nitrogen: 2 to 5 liters per minute.

By way of comparison, a passage time of 17 hours with a maximum temperature of 1200° C. in a controlled atmosphere gives good results under the conditions of a conventional sintering in a conventional furnace (gas-tight furnace in this case).

The comparison of the conventional sintering method with the process according to the invention gives the results summarized in the following table, in the case of the preceding examples:

TABLE I

| Characteristics obtained by the sintering method | Conventional | According to the invention |
|---|---|---|
| Permeability $\mu$ at 1 kHz | 650 | 630 to 950 |
| Losses factor tan $\delta/\mu$ at 1 MHz | $25.10^{-6}$ | 10 to $23.9 \cdot 10^{-6}$ |
| Product of $\mu$ by Q (coefficient of overvoltage) | 40 000 | 41840 to 97090 |
| Coefficient of relative hysteresis $n_\beta$ at 10 kHz | $1.75.10^{-3}$ | 0.52 to $1.22.10^{-3}$ |
| Temperature factor: | | |
| 5 to 25° C. | $2.5.10^{-6}$ | 1.1 to $2.6.10^{-6}$ |
| 25° C. to 55° C. | $2.5.10^{-6}$ | 1.0 to $2.7.10^{-6}$ |
| Factor of disaccommodation | $12.10^{-6}$ | 5.9 to $12.10^{-6}$ |

Secondly, there will now be described by way of example, the rapid sintering of nickel-zinc ferrites according to the invention.

The same steps are carried out as in the case of manganese-zinc ferrites as concerns the preparation of the unbaked components, by starting with the mixture of oxides in the following proportions:
$Fe_2O_3$: 0.607 (in moles);
$NiO$: 0.228 (in moles);
$ZnO$: 0.165 (in moles).

In addition, the mixture comprises small additions of CoO and $MnO_2$ the use of which is conventional to obtain the desired characteristics in the case of telecommunications pot-cores.

The sintering according to the invention takes place in the passage kiln just described with reference to the preceeding example, but with a different travel speed, for example about 3 cm/min, namely a passage time of 47½ minutes.

FIG. 2 shows the temperature curve as a function of the distance travelled through in a similar way to FIG. 1. The curve of the composition of the atmosphere is eliminated since the sintering takes place in the air of the atmosphere. The maximum of the curve 20 (T) is reached at T=1380° C. substantially before the middle of the kiln. The temperature gradients at 1,000° C. are given by the slopes of the tangents at the points of untersection of the curve and the line of the ordinate of 1000° C., namely around +70° C./min in the rising part and −35° C. in the descending part of the curve.

In order to compare, in the case of nickel-zinc ferrites, the results of conventional sintering with those of the process according to the invention, there are given in Table 2 the conditions of the production of four sinterings the first of which is carried out in a conventional furnace whereas the other three (2, 3 and 4) are sinterings according to the invention, carried out in the previously described kiln. The sintered components are half-cores for telecommunications pots having a diameter of 9 mm and a height of 2.5 mm.

TABLE II

| | SINTERINGS N° | | | |
|---|---|---|---|---|
| CONDITIONS | 1 (Conventional) | 2 | 3 | 4 |
| Maximum temperature | 1200° C. | 1380° C. | 1435° C. | 1460° C. |
| Total duration under an atmosphere at normal pressure with annealing (temperature, duration and atmosphere) | 15–20hr | 47min 30sec | 25min | 12min30s |
| | air | air | air | air |
| | 525° C. | 600° C. | 600° C. | 600° C. |
| | 6hours oxygen | 1hour oxygen | 1hour oxygen | 1hour oxygen |

In Table 3 hereafter are shown the characteristics of the components obtained in the conditions made precise in Table 2.

TABLE III

| | SINTERINGS N° | | | |
|---|---|---|---|---|
| CONDITIONS | 1 (Conventional) | 2 | 3 | 4 |
| Permeability at 1KHz | 80 | 91 | 84 | 83 |
| Losses factor at 10MHz | $100.10^{-6}$ | $80.10^{-6}$ | $86.10^{-6}$ | $95.10^{-6}$ |
| Product of $\mu$ by Q | 1000 | 12500 | 11590 | 10540 |
| Factor of temperature between 5 and 55° C. | $5.10^{-6}$ | $3.9.10^{-6}$ | $5.10^{-6}$ | $5.10^{-6}$ |
| Temperature coefficient | 5% | 1.4% | 5% | 5% |

Within the framework of the characteristics of the invention, there must be mentioned the possibility of eliminating a large part or all of the handling operations so as to provide a partly or completely automatic installation.

Such an installation comprises for example, a plurality of sintering kilns in parallel, each one of which is supplied with unbaked components, by means of an automatic system, for example an endless belt, from a compacting press.

In an entirely automatic installation, the sintering kiln or kilns and the compacting presses are an integral part of a production line. During the rapid sintering, it is possible to organize a production which involves work only in the day-time, whereas the conventional production lines for ferrites require night shifts. This is an additional advantage of the invention.

What we claim is:

1. A process for rapidly sintering ceramic components comprising oxides of iron, manganese and zinc mixed with a binder, wherein the unbaked components of the ceramic to be sintered, in the shape of half-cores for telecommunication pots, have a diameter in the range of 9–14 mm and a height in the range of 2.5–4 mm, in the state of unbaked component is subjected to a heat treatment in a nitrogen atmosphere wherein said treatment has a total duration of 16 to 33 minutes, during which treatment the curve of the temperature as a function of the time has a first part rising with a positive slope between 50° C./min. and 500° C./min., then a second part which rises then descends in passing through a maximum of 1300° C., and a third part descending with a negative slope of absolute value between 30° C./min. and 300° C./min.

2. A process for rapidly sintering ceramic components comprising oxides of iron, nickel and zinc mixed with a binder, wherein the unbaked components of the ceramic to be sintered, in the shape of half-cores for telecommunication pots, have a diameter in the range of 9–14 mm and a height in the range of 2.5–4 mm, in the state of unbaked component is subjected to a heat treatment having a total duration of about 47½ minutes, during which treatment the curve of the temperature as a function of the time has a first part rising with a positive slope between 50° C./min. and 500° C./min., then a second part which rises then descends in passing through a maximum of 1380° C., and a third part descending with a negative slope of absolute value between 30° C./min. and 300° C./min.

* * * * *